(12) United States Patent
Goehring et al.

(10) Patent No.: US 11,108,650 B1
(45) Date of Patent: Aug. 31, 2021

(54) CLOUD-BASED SYSTEM AND HARDWARE FOR PROVIDING REMOTE ACCESS TO LOCAL INSTRUMENTATION

(71) Applicants: Mark Goehring, Bakersfield, CA (US); David Pitzer, Bakersfield, CA (US); Curtis Reedy, Bakersfield, CA (US)

(72) Inventors: Mark Goehring, Bakersfield, CA (US); David Pitzer, Bakersfield, CA (US); Curtis Reedy, Bakersfield, CA (US)

(73) Assignee: Tyrion Integration Services, Inc., Bakersfield, CA (US)

( * ) Notice: Subject to any disclaimer, the term of this patent is extended or adjusted under 35 U.S.C. 154(b) by 273 days.

(21) Appl. No.: 15/483,962

(22) Filed: Apr. 10, 2017

Related U.S. Application Data

(60) Provisional application No. 62/320,211, filed on Apr. 8, 2016.

(51) Int. Cl.
| | |
|---|---|
| *G06F 15/173* | (2006.01) |
| *H04L 12/24* | (2006.01) |
| *G06F 11/30* | (2006.01) |
| *G06F 9/4401* | (2018.01) |
| *H04L 29/06* | (2006.01) |
| *H04L 29/08* | (2006.01) |

(52) U.S. Cl.
CPC ............ *H04L 41/28* (2013.01); *G06F 9/4413* (2013.01); *G06F 11/3006* (2013.01); *G06F 11/3041* (2013.01); *G06F 11/3051* (2013.01); *H04L 67/10* (2013.01); *H04L 67/42* (2013.01)

(58) Field of Classification Search
CPC ......... H04L 41/28; H04L 67/10; H04L 67/42; G06F 9/4413; G06F 11/3006; G06F 11/3051; G06F 11/3041; G06F 11/3003; G06F 11/3055; G06F 11/3058; G06F 11/3062; G06F 11/3065
USPC ........................................................ 709/225
See application file for complete search history.

(56) References Cited

U.S. PATENT DOCUMENTS

| | | | | |
|---|---|---|---|---|
| 2007/0046040 | A1* | 3/2007 | Chang | ............. E05B 47/0047 292/341.16 |
| 2015/0348554 | A1* | 12/2015 | Orr | .................. G10L 17/22 704/275 |
| 2016/0165442 | A1* | 6/2016 | Shi | .................. H04W 12/06 726/4 |

(Continued)

*Primary Examiner* — Ahn Nguyen
(74) *Attorney, Agent, or Firm* — R. Scott Kimsey, Esq.

(57) ABSTRACT

A system for providing local and remote access to an I/O device includes a hardware device having a microprocessor, an I/O interface, a LAN interface, and a WAN interface. The microprocessor is configured to coordinate the I/O interface, the LAN interface, and the WAN interface. The hardware device is configured to provide plug-and-play functionality with respect to an I/O device in communication with the hardware device via the I/O interface. A cloud server is in electronic communication with the hardware via the LAN interface. A first client device is in electronic communication with the cloud server and configured to access the hardware device therethrough. A second client device is in electronic communication with the hardware device via the WAN interface. A user of the system can access, control, and/or monitor the I/O device via the hardware device upon accessing the hardware device using the first or second client device.

5 Claims, 9 Drawing Sheets

(56) References Cited

U.S. PATENT DOCUMENTS

| | | | |
|---|---|---|---|
| 2017/0257257 A1* | 9/2017 | Dawes | H04L 67/025 |
| 2018/0198802 A1* | 7/2018 | Dawes | H04L 67/12 |
| 2018/0347232 A1* | 12/2018 | Cordiner | G08B 13/06 |

* cited by examiner

CLOUD-BASED SYSTEM AND HARDWARE FOR PROVIDING REMOTE ACCESS TO LOCAL INSTRUMENTATION

RELATED APPLICATIONS

The present application claims priority of U.S. Provisional Patent Application No. 62/320,211, filed Apr. 8, 2016 and entitled "Cloud-Based System and Hardware for Providing Remote Access to Local Instrumentation," which application is incorporated herein by reference.

BACKGROUND AND FIELD

1. Technical Field

The present disclosure relates to a hardware and software-based cloud computing system, and more specifically to a cloud-based system providing remote access to local instrumentation.

2. Background

Modern cloud-based architectures provide users with a variety of options for connectivity with software and devices across distances. Exemplary systems of this type allow access to actively interface with a remote or local device using an application on a mobile device such as a smartphone, for example. The ability to monitor and control is limited by the time and ability of the user. Further, such systems are configured to operate with respect to specific devices, requiring a large number of apps and/or devices to control a variety of connected devices. The apps and hardware configuration associated with such devices are also specific to given devices.

SUMMARY

A system for providing local and remote access to an I/O device includes a hardware device having a microprocessor, an I/O interface, a LAN interface, and a WAN interface. The microprocessor is configured to coordinate the I/O interface, the LAN interface, and the WAN interface. The hardware device is configured to provide plug-and-play functionality with respect to an I/O device in communication with the hardware device via the I/O interface. A cloud server is in electronic communication with the hardware via the LAN interface. A first client device is in electronic communication with the cloud server and configured to access the hardware device therethrough. A second client device is in electronic communication with the hardware device via the WAN interface. A user of the system can access, control, and/or monitor the I/O device via the hardware device upon accessing the hardware device using the first or second client device.

One aspect of the present disclosure provides a system for monitoring and controlling an enclosure to which limited access is desired. The system includes a hardware device having an input/output interface, a networking interface, and a microprocessor configured to coordinate the input/output interface and networking interface. An electronic lock is in communication with the input/output interface of the hardware device. A cloud server is in electronic communication with the networking interface of the hardware device. A portable client device is in electronic communication with the cloud server. The hardware device is configured to read the state of the electronic lock and report that state to the cloud server. The portable client device is configured to obtain the state of the electronic lock from the cloud server. The portable client device is configured to change the state of the electronic lock via the cloud server and the hardware device.

In another aspect of the present disclosure, a plurality of portable client devices are provided, of which the above portable client device is one, and the hardware device is configured to communication via the networking interface with each of the plurality of portable client devices.

In another aspect of the present disclosure, each of the plurality of portable client devices is configured to identify a user of that respective device. The hardware device uploads to the cloud server data identifying the user of any portable client device used to change the state of the electronic lock (e.g. to change the electronic lock from an unlocked state to a locked state).

In another aspect of the present disclosure, the hardware device is configured to allow the electronic lock to be changed from a locked state to an unlocked state only when each and every user recorded as initially setting the electronic lock to the locked state subsequently sets the electronic lock to the unlocked state.

BRIEF DESCRIPTION

DETAILED DESCRIPTION

Definitions

Figure 1:
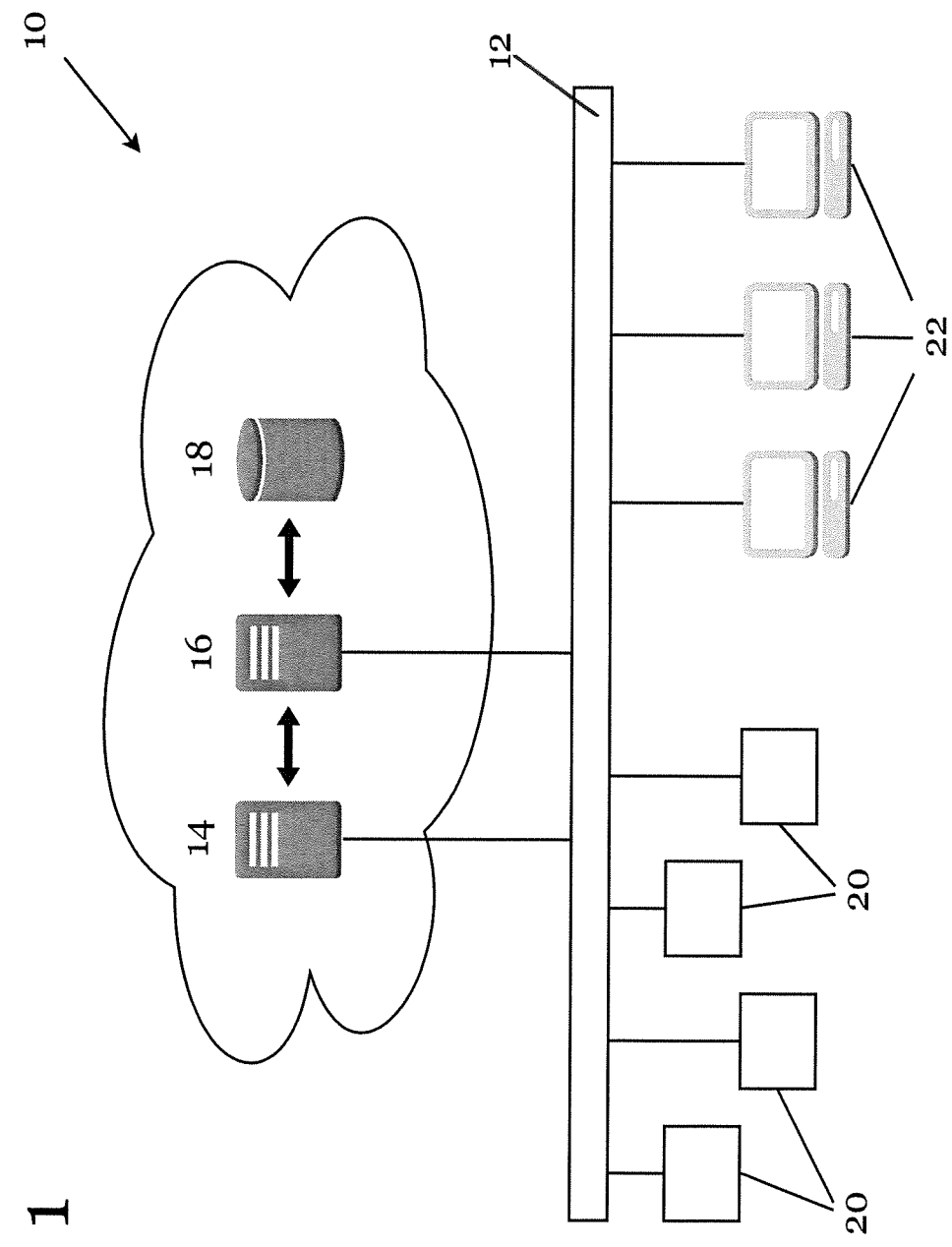
FIG. 1 depicts the overall network structure of one embodiment of the system of the present disclosure.

In 2009, the National Institute of Standards and Technology ("NIST") published its definition of cloud computing in NIST Special Publication No. 800-145, entitled "The NIST Definition of Cloud Computing," by Peter Mell and Timothy Grance. Various terms utilized in the NIST publication are utilized herein, and are defined by NIST as follows:

Cloud Computing: "Cloud Computing" is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

The five characteristics are as follows:

On-Demand Self-Service: A consumer can unilaterally provision computing capabilities, such as server time and network storage, as needed automatically without requiring human interaction with each service provider.

Broad Network Access: Capabilities are available over the network and accessed through standard mechanisms that promote use by heterogeneous thin or thick client platforms (e.g., mobile phones, tablets, laptops, and workstations).

Resource Pooling: The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be appropriated in any quantity at any time.

Measured Service: Cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The three service models are as follows:

Software as a Service (Saas): The capability provided to the consumer is to use the provider's applications running on a cloud infrastructure. The applications are accessible from various client devices through either a thin client interface, such as a web browser (e.g., web-based email), or a program interface. The consumer does not manage or control the underlying cloud infrastructure including network, servers, operating systems, storage, or even individual application capabilities, with the possible exception of limited user-specific application configuration settings.

Platform as a Service (Paas): The capability provided to the consumer is to deploy onto the cloud infrastructure consumer-created or acquired applications created using programming languages, libraries, services, and tools supported by the provider. The consumer does not manage or control the underlying cloud infrastructure including network, servers, operating systems, or storage, but has control over the deployed applications and possibly configuration settings for the application-hosting environment.

Infrastructure as a Service (Iaas): The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, and deployed applications; and possibly limited control of select networking components (e.g., host firewalls).

The four deployment models are as follows:

Private Cloud: The cloud infrastructure is provisioned for exclusive use by a single organization comprising multiple consumers (e.g., business units). It may be owned, managed, and operated by the organization, a third party, or some combination of them, and it may exist on or off premises.

Community Cloud: The cloud infrastructure is provisioned for exclusive use by a specific community of consumers from organizations that have shared concerns (e.g., mission, security requirements, policy, and compliance considerations). It may be owned, managed, and operated by one or more of the organizations in the community, a third party, or some combination of them, and it may exist on or off premises.

Public Cloud: The cloud infrastructure is provisioned for open use by the general public. It may be owned, managed, and operated by a business, academic, or government organization, or some combination of them. It exists on the premises of the cloud provider.

Hybrid Cloud: The cloud infrastructure is a composition of two or more distinct cloud infrastructures (private, community, or public) that remain unique entities, but are bound together by standardized or proprietary technology that enables data and application portability (e.g., cloud bursting for load balancing between clouds).

Other definitions utilized herein include the following:

Client Device: as used herein, the term "client device" includes any type of suitable computing device, including, but not limited to, a desktop computer, a laptop computer, a tablet, a smartphone or other mobile phone, a personal digital assistant (PDA), a computer workstation, a navigation device, a game console, an internet appliance, a security terminal or station, any other suitable stationary or mobile computing device, or any combination of these, having the capability to connect to a cloud computing environment or other network.

Cloud Infrastructure: As used herein, the term "cloud infrastructure" means is the collection of hardware and software that enables the five characteristics of cloud computing. The cloud infrastructure can be viewed as containing both a physical layer and an abstraction layer. The physical layer includes the hardware resources that are necessary to support the cloud services being provided, and typically includes server, storage and network components. The abstraction layer includes the software deployed across the physical layer, which manifests the cloud characteristics. Conceptually the abstraction layer sits above the physical layer.

Computer-Readable Medium: As used herein, the term "computer-readable medium" includes any signal or storage medium that may be read by a computer. Examples of a computer-readable storage medium may include, but is not limited to, an electronic, magnetic, optical, electromagnetic, infrared, or semiconductor device or system, or any combination of these. Specific examples of computer-readable storage devices include a portable computer disk, a hard disk, a random-access memory (RAM), a read-only memory (ROM), an erasable read-only memory (EPROM), a flash memory, a compact disc or other optical storage device, a magnetic storage device, a solid state storage device, or any combination of these. Computer-readable signal media include a propagated data signal with computer-readable program code embodied therein. Such propagated signals may include, but are not limited to, electromagnetic and optical signals, or any combination of these.

Network: As used herein, the term "network" includes any suitable computing network, including, but not limited to, the internet, a wide-area network (WAN), a local-area network (LAN), a cellular or other telephone network, a WiFi or other wireless network, or any combination of these configured to carry out the present system.

Plug-and-Play: As used herein, the term "plug-and-play" refers to hardware or software that, upon being installed or connected, can be used with little or no configuration by the end user.

SCADA: As used herein, the abbreviation "SCADA" stands for Supervisory Control and Data Acquisition. A SCADA system uses coded signals over communications channels to allow remote monitoring and control of equipment.

Although the preferred embodiment of the present system described in detail herein utilizes a cloud computing model wherein the internet serves as the network connecting the various components of the system, it is contemplated that any suitable computing network may be used.

Various embodiments of the devices, methods, and system of the present disclosure are provided herein, and numerous specific details are set forth to provide a thorough understanding of the structure, function, and use of the embodiments. It should be noted that in some instances well-known operations, components, and elements of the disclosed embodiments may be provided with less detail. Those of ordinary skill in the art will understand such operations, components, and elements upon reading this disclosure. Further, those of ordinary skill in the art will recognize that the embodiments described herein and shown in the accompanying figures are non-limiting, and that the structural and functional details provided herein may be exemplary only, and do not limit the scope of the present embodiments.

Throughout this disclosure, phrases such as "one embodiment," "some embodiments," "various embodiments," "an embodiment," "an exemplary embodiment," or similar terminology may be used. It is understood that such language means the particular structure, feature, step, element or the like of characteristics described is included in at least one embodiment. Such phrases do not necessarily all refer to the same embodiment, and the particular structures, features, steps, elements, and the like described herein may be combined in any suitable manner in one or more embodiments. In either instance, the present system provides "plug and play" functionality for devices associated with the system.

The following disclosure provides a method, product, and system for remote access to local instrumentation. The present system is cloud-based, and includes a pre-built user interface. For simple on/off devices, no configuration of the present system is necessary. The device to be monitored and controlled may simply be connected to the present system and the various features and capabilities of the present system will be made available with respect to that device. Devices that are more complicated than simple on/off devices may require additional configuration upon being connected to the present system. This configuration can be accomplished using the pre-built user interface associated with the present system.

The present system includes data logging with respect to user devices connected to the system. The system automatically stores device history, trends, and changes in system data over time out of the box, upon being connected to a device, with no need for complex user configuration to ensure functionality. This information is stored in the cloud and accessible to the user from any location.

The present system also includes a highly configurable security component that allows a user to establish users and groups, and to establish varying levels of access to the system, according to user parameters or parameters belonging to a group to which the user belongs. Security settings may allow differential access to data stored in the system, such as trends over time, with some users being able to view only instantaneous data while other users can view trends over any selected time period. Any of the functions associated with the present system may also be tied to a privilege/access level determined by user or group settings.

Users with appropriate access levels may audit the present system. This audit may include the ability to see which other users are logged into the system, which devices associated with the present system have been energized, when and by whom such devices were energized, and the like. The auditing system may generate customizable reports, the contents of which may also be limited by security preferences associated with a given user's account.

While the present system is configured to be used via a WAN, with data and functionality accessible via the cloud, it is contemplated that the present system may also include a local pre-built interface to allow access to one or more associated devices with the need for connectivity to the cloud. Local access may be accomplished via a LAN, or via a direct, wired connection to the hardware of the present system. It is preferred that the present system provide a user with all of the same capabilities whether in local or cloud-connected mode. Once cloud connectivity has been restored, data stored on the hardware of the present system during local access is uploaded to the cloud and the cloud data synced with local hardware to reflect the most recent data.

Some embodiments of the present system also have the capability of running third-party software in conjunction with the base functionality of the present system. Further, in some embodiments a front-end SCADA system can be installed on the local hardware of the present system such that the local hardware may be utilized as a server, retaining all of the remote monitoring and control features of the present system and its cloud-based servers.

Referring now to the figures, wherein like numerals indicate like parts, the numeral 10 refers generally to the overall network structure of an embodiment of the present system. The embodiment of system 10 shown in FIG. 1 includes cloud components such as device server 14, client server 16, and central database 18. Physical components include one or more I/O devices 20 and client devices 22. The various components of system 10 communicate via network 12, which is, in a preferred embodiment of system 10, the internet.

Figure 2:
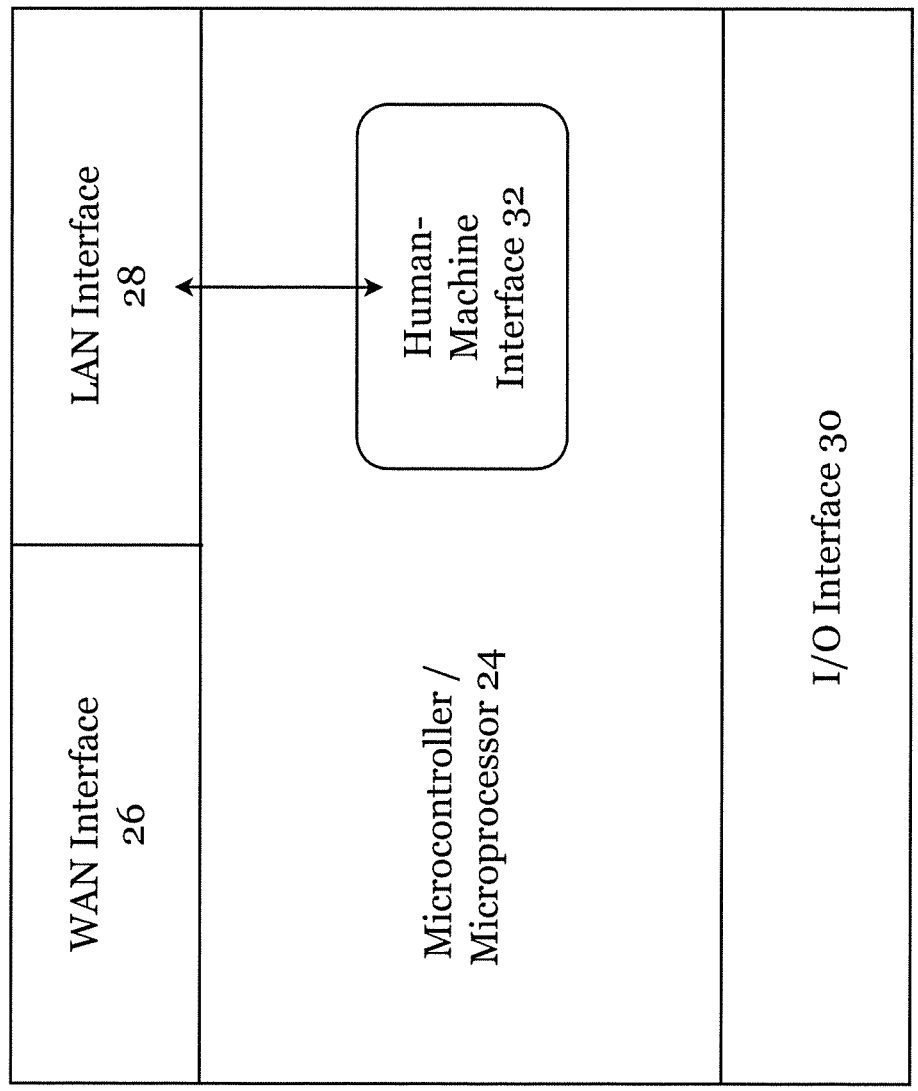
FIG. 2 depicts the hardware architecture of one embodiment of the present system.

FIG. 2 depicts one embodiment of a hardware architecture associated with I/O devices 20 of the present system. Hardware 34 includes a microprocessor or microcontroller 24 that processes data according to instructions in memory. A LAN interface 28, such as an Ethernet connection, Bluetooth® connectivity, or WiFi capability is provided, as is a WAN interface 26, which allows hardware 34 to connect to, and transmit data over, a wide-area network. I/O interface 30 is provided so that hardware 34 can provide the necessary handshaking signals to one or more I/O devices 20 and communicate therewith. An embedded human-machine interface 32 is also provided, and is preferably accessible via LAN interface 28. The human-machine interface 32 may include a graphical user interface, and may provide a graphics-based representation of the I/O device 20 and associated controls available to a user of hardware 34. While hardware 34 is shown as having a human-machine interface 32 accessible via LAN interface 28, it is contemplated that in some embodiments of hardware 34, the human-machine interface 32 may be accessible via WAN interface 26. In such embodiments, it is preferred that access via WAN interface 26 require higher system privileges than access via LAN interface 28. In an exemplary embodiment of an electronic locking and monitoring mechanism, described below, computer system 36 provides the functionality of hardware 34.

Figure 3:
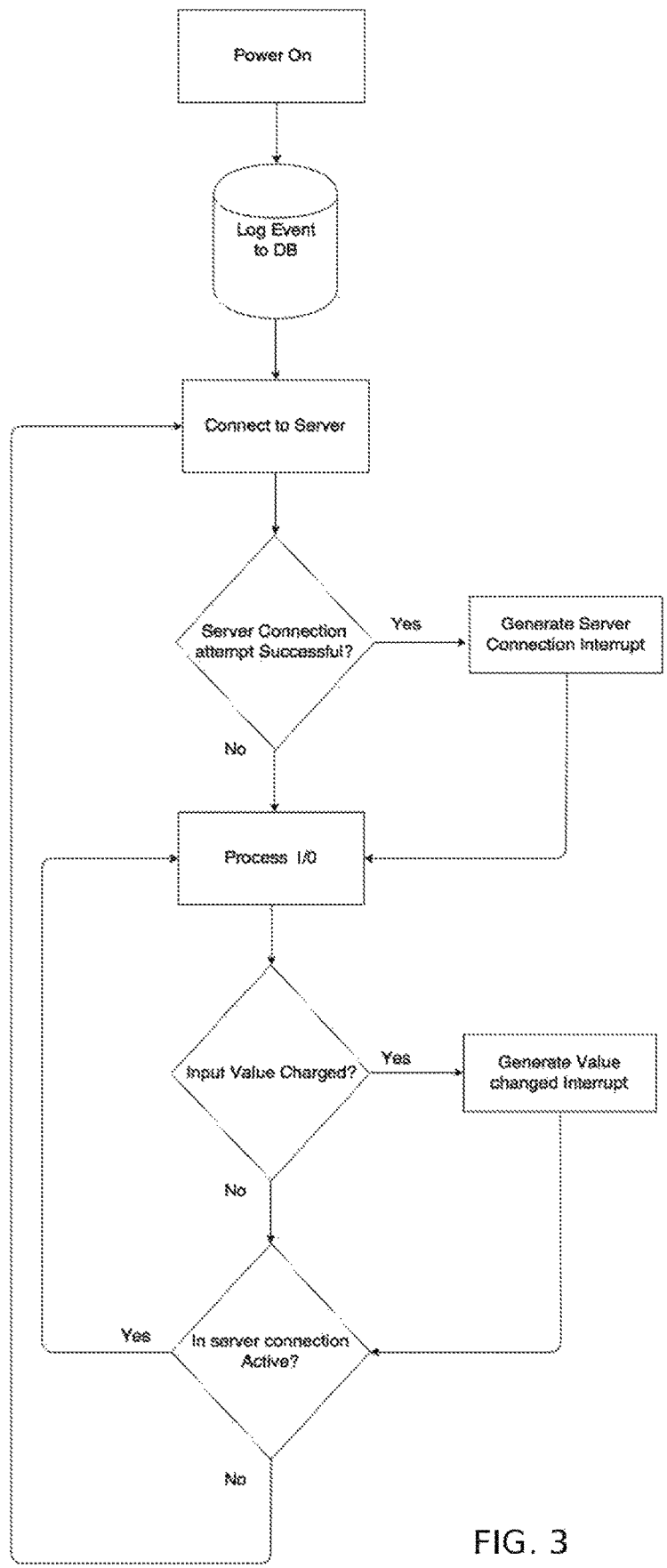
FIG. 3 is a flowchart depicting the continuous logic of one embodiment of the present system.

FIG. 3 is a flowchart setting forth the continuous logic run on the hardware of the present system. When the system is powered on, the event is logged to a local database associated with the system. The system then attempts connection to a device server. If the connection is successful, a Server Connect interrupt is generated. I/O data is processed and a determination is made as to whether an input value has changed. If there is no change, the system checks for an active server connection. If there is an active connection, the system returns to monitoring I/O and processing data. This loop continues so long as a server connection is active. If the server connection is not active, the system attempts to establish a connection to a server and again generates a server connection interrupt if successful. If the input value is determined to have changed, a Value Changed interrupt is generated. There are four types of interrupts that can cause the system program to interrupt its normal program loop: Value Changed, Message Received, Server Connect, and Server Disconnect.

Figure 4:
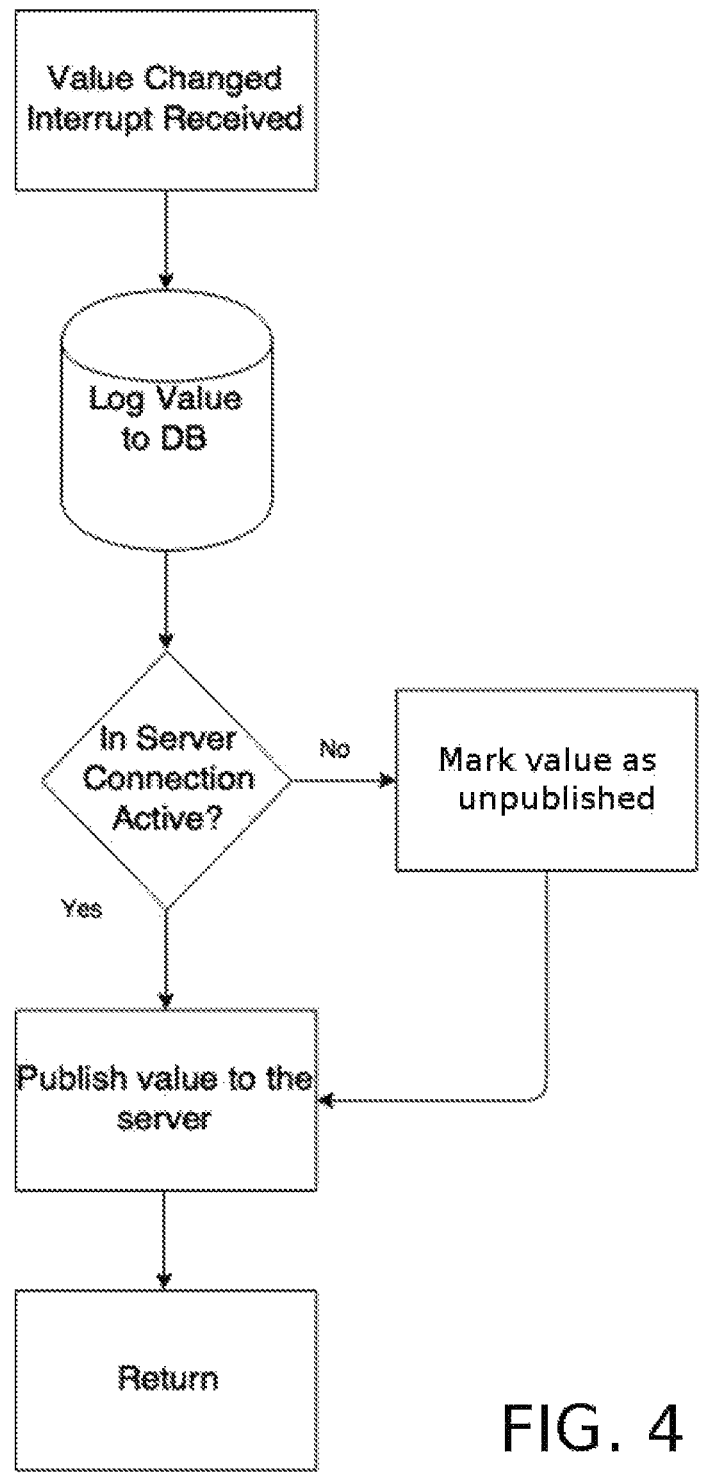
FIG. 4 is a flowchart depicting steps of the Value Changed interrupt handler of one embodiment of the present system.

FIG. 4 is a flowchart depicting the Value Changed interrupt handler. When a Value Changed interrupt is received by the system, the value is logged to the local database. The system then checks for an active server connection. If the connection to the server is active, the value is published to the cloud-hosted server and the local data is flagged as published. If the server connection is not active, the local data is flagged as unpublished. After either publishing the data to the cloud-hosted server, or marking the local data as unpublished, the system returns to its normal program loop.

Figure 5:
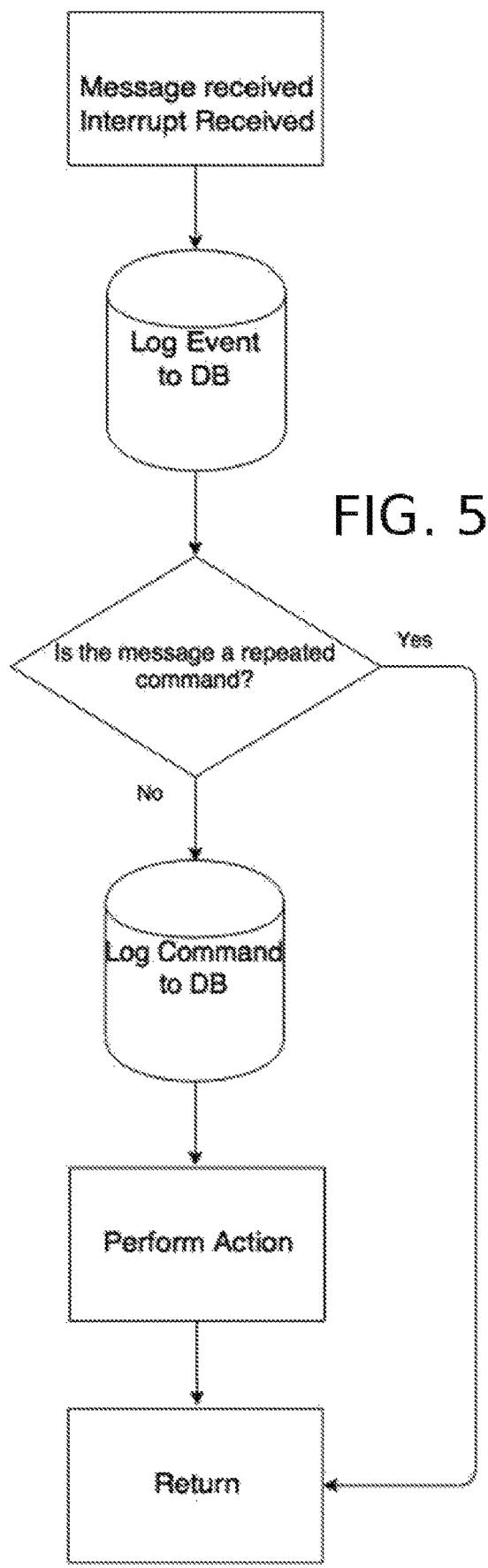
FIG. 5 is a flowchart depicting steps of the Message Received interrupt handler of one embodiment of the present system.

FIG. 5 is a flowchart depicting the Message Received interrupt handler. When a message is received by the system, the event is logged to the local database. The system determines whether the message constitutes a unique, valid command. If it is determined that the message constitutes a unique, valid command the action is logged to the local database and the command is performed. If the message does not constitute a unique, valid command, the message is ignored by the system. After either performing the command contained within the message, or determining that the message should be ignored, the system returns to its normal program loop.

Figure 6:
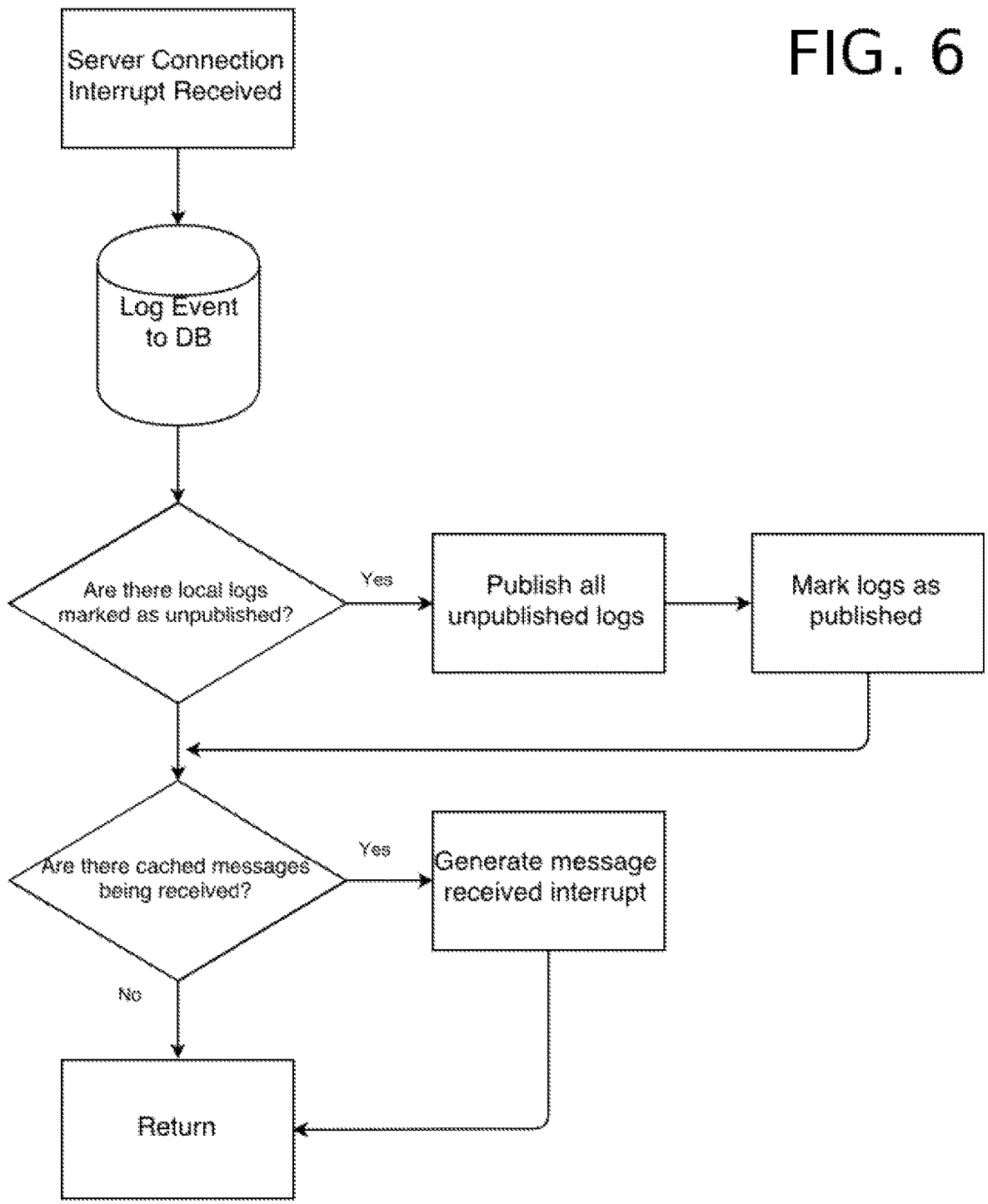
FIG. 6 is a flowchart depicting steps of the Server Connection interrupt handler of one embodiment of the present invention.

FIG. 6 is a flowchart depicting a Server Connect interrupt handler. When a Server Connect interrupt is received by the system, the event is logged to the local server. The system then checks local data to determine whether there are local logs flagged as unpublished. If there are local logs flagged as unpublished, the system publishes all such logs to the cloud-hosted server and flags those logs as published. After handling the unpublished logs, or determining that there are no such logs, the system checks local data to determine whether there are cached messages being received into the system. If there are cached messages, the system generates a Message Received interrupt for each such message. After either determining there are no cached messages being received, or generating Message Received interrupts for each cached message, the system returns to its normal program loop.

Figure 7:
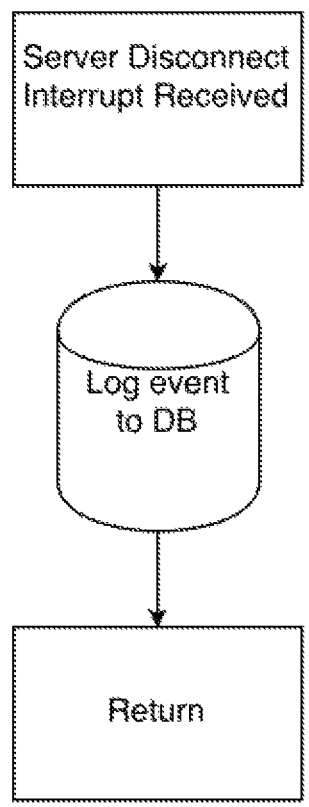
FIG. 7 is a flowchart depicting steps of the Server Disconnect interrupt handler of one embodiment of the present invention.

FIG. 7 is a flowchart depicting a Server Disconnect interrupt handler. When the connection to the cloud-hosted server is lost, the event is logged to the local system database. The system then returns to its normal program loop.

It should be noted that all data transmitted to the cloud is hosted on one or more central servers. An authenticated user of the present system can view and filter the data from any I/O devices 20 to which they have access. The user may use the cloud interface to configure logging, reporting, alarming, and access control for any of the various I/O devices 20 to which they have access. The user can also send commands to such devices to toggle local outputs and configure device settings.

Figure 8:
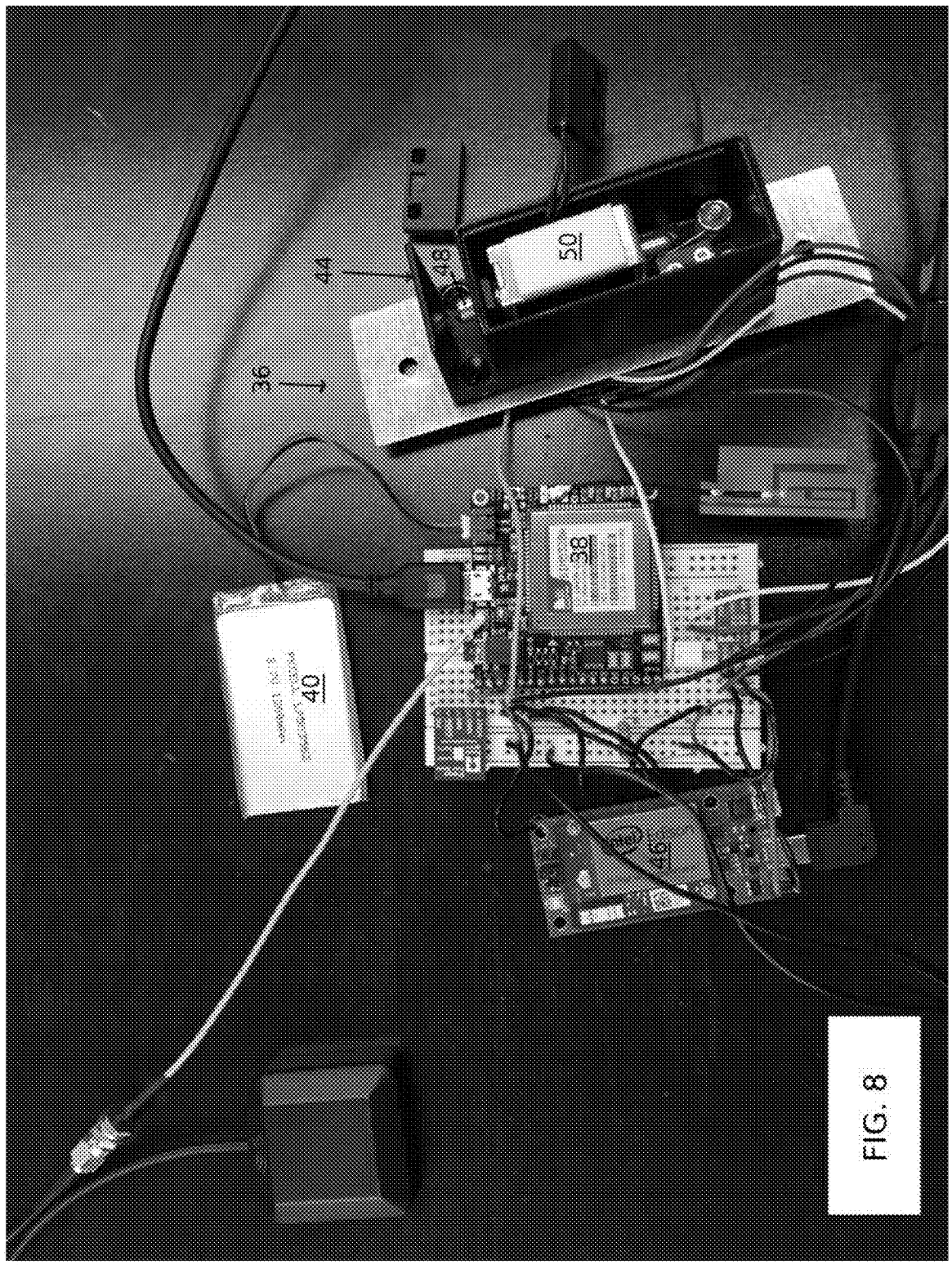
FIG. 8 depicts one embodiment of a locking and monitoring mechanism suitable for use with the present system.

FIG. 8 is a partially disassembled view of one embodiment of an electronic lock and monitor 36 of the present system. Electronic lock and monitor 36 is described in greater detail as an Example of the present system, below.

Figure 9:
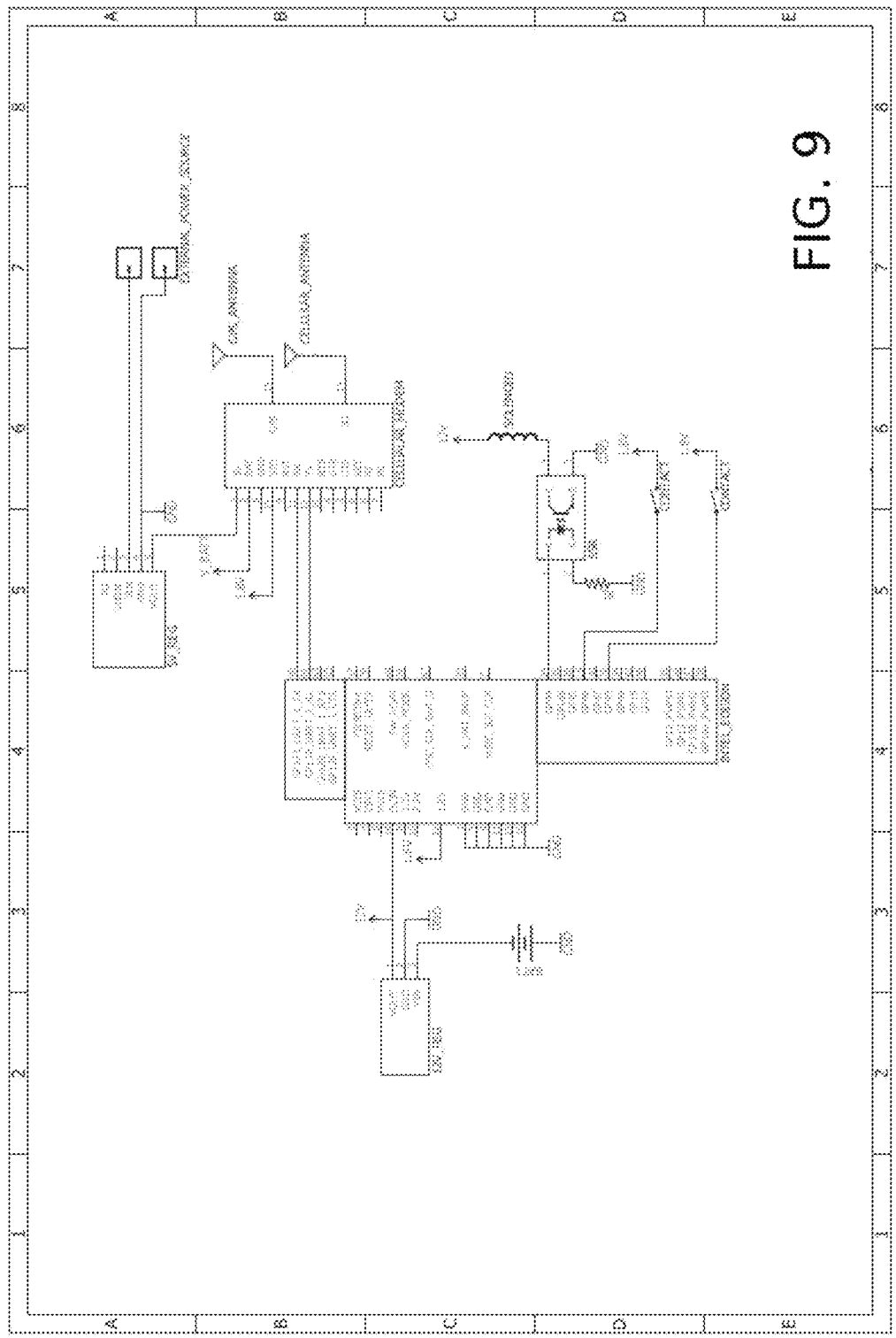
FIG. 9 is a circuit diagram of one embodiment of an electronic locking and monitoring mechanism suitable for use with the present system.

FIG. 9 is a circuit diagram of one embodiment of an electronic lock and monitor 36 of the present system. It is contemplated that the details of the circuit diagram will be apparent to one of skill in the art upon reading this disclosure.

Example—Electronic Lock and Monitor

One embodiment of an I/O device 20 for use with the present system is electronic lock and monitor 36, shown in FIG. 8. Electronic lock and monitor 36 may be installed, for example, in an industrial process enclosure, electrical enclosure, or any field or remote enclosure that it may be desirable to monitor for power, theft, or an open door. In addition to providing remote control of several processes, electronic lock and monitor 36 also preferably provides the ability to view cloud-stored information and to control various processes locally. Electronic lock and monitor 36 includes a cellular module 38, an indicator 42, an electronic lock 44, and a computer system 46 with a local database. The system is preferably powered by a rechargeable lithium polymer batter 40. Computer system 46 may be, for example, a general purpose computing platform such as the Intel® Edison Breakout board, as shown in FIG. 8. This computer system 46 includes WiFi capacity, Bluetooth®, storage, a processor, RAM, a USB interface, and a power jack, among other components. It is contemplated that any suitable computing platform such as, for example, a Raspberry Pi,® may also be utilized.

Cellular module 38 is configured to communicate with the communications networks of one or more cellular carriers. Cellular module 38 may be configured to work with networks based on Global System for Mobile communications (GSM) protocols (e.g. GSM/GPRS/Edge, as shown in FIG. 8), configured to work with Code Division Multiple Access (CDMA) networks, or a combination of the two. It is contemplated that some embodiments of electronic lock and monitor 36 may be configured for use with satellite-based radio or other wireless communications networks.

As noted above, computer system 46 preferably includes a computer-readable storage medium, such that electronic lock and monitor 36 may include a local database to access, track, and historicize events for later audit and/or transmission to cloud-based components of the system. Process control data is also maintained locally on the computer-readable storage medium of computer system 46. Data stored or processed by computer system 46 is transmitted to one or more cloud-hosted servers via cellular radio 38. The cloud-hosted server provides a user of the present system with access to alarming and reporting functions, as well as data retrieval and the ability to customize reporting and various features of the present system. One or more input/output mechanisms may be used to carry data to and away from computer system 46. Suitable input/output structures or methods may include coaxial cable, universal serial bus (USB) connectors, Ethernet connections, and the like. Combinations of various connection may also be used. Further, wireless input/output mechanisms, such as Bluetooth® modules, may also be utilized.

The use of wireless gateways is known in the art. Such gateways allow computers and other devices to access shared wireless network connections. Wireless gateway, for example may route packets between a LAN of the present system and another network, such as a WAN associated with the present system. Wireless gateway may allow multiple devices of the present system to utilize a localized WiFi network. A wireless gateway may also be in communication with cellular module 38 to allow the exchange of data between a LAN of the present system and a cellular network. In some embodiments of cellular module 38, a wireless gateway may be included as an integral component of the cellular modem. It is contemplated that cellular module 38 may add General Packet radio Service (GPRS), 3G, 4G, 4G LTE, 5G, or other suitable connectivity, whether now known or later developed, to the present system.

Electronic lock 44 includes a bolt 48 and a solenoid 50. When solenoid 50 is energized, a magnetic field is created around the coil within the solenoid and bolt 48 is retracted into the solenoid housing, toward the coil. This allows the enclosure secured by electronic lock 44 to be opened. When a user of the present system causes the flow of current to the solenoid to cease, electronic lock 44 once again assumes a locked position. In some embodiments of the present system, a delay circuit may be provided to maintain the solenoid in an energized state for a predetermined amount of time once the solenoid has been energized by a user of the system. Indicator 42 is provided to allow a user to ascertain, by visual inspection, whether electronic lock 44 is in a locked or unlocked state. Any suitable indicator mechanism may be used. For example, indicator 42 may include a light that is lit when electronic lock is in a locked position, to give a positive indicator of that state. Alternatively, indicator 42 may include a combination of lights, one or more of which is lit when electronic lock 44 is in a locked state, and one or more others of which is lit when electronic lock 44 is in an unlocked state. Indicator 42 may also include any of a variety of physical indicators, or may display certain indicia such as "LOCKED" or "UNLOCKED" to indicate the state of electronic lock 44.

It is contemplated that electronic lock 44 can be locked and unlocked via a local wireless network, using any portable computing device such as a mobile phone or tablet. In some embodiments of the present system, unlocking may be achieved remotely, via access to electronic lock 44 through a cloud-hosted server. Cloud access may be obtained through the use of any suitable computing device, including, but not limited to, a desktop computer, tablet, or mobile phone. In some embodiments of the present system, security measures preventing unauthorized access via the cloud may be implemented, including measures that require greater user privileges in order to lock or unlock electronic lock 44 via a cloud-hosted server.

In some embodiments of the present system, electronic lock 44 may be a multiple state device in which multiple users of the present system establish digital locks, via their own unique digital signatures. Electronic lock 44 may be configured, for example, such that all digital signatures associated with electronic lock 44 must be utilized in order for electronic lock 44 to be placed in an unlocked state. In some embodiments, the digital signatures used may be associated with different levels of privilege with respect to the present system, such that for some privilege levels all digital signatures must be used to unlock electronic lock 44, while for other, higher privilege levels few digital signatures, or even a single digital signature, are needed to accomplish the same task.

In addition to the locking function performed by electronic lock and monitor 36, the device may be configured to monitor power and processes associated with the enclosure in which electronic lock and monitor 36 is used. When a primary power source is interrupted, for example, electronic lock and monitor 36 may rely on a backup power source to maintain a minimal ongoing run time, and during that run time may generate alerts to users of the system indicating that there has been a power loss. Electronic lock and monitor 36 may provide additional information along with said alert, or in separate alerts. This additional information may include, for example, the locked or unlocked state of electronic lock 44. Once the system is again at full power, electronic lock and monitor 36 may send an alert to the user indicating that power has returned to the system, and may send additional information such as the state of electronic lock 44. The system may also alert the user to any adverse consequences of the power failure, any adverse events that may have taken place during the time period of the power loss, and any process control data that is captured and moved to the cloud once power returns.

In some situations, primary power may be lost and backup power may be depleted before primary power can be restored. It is contemplated that electronic lock and monitor 36 may be energized directly via an external power supply. For example, a user of the present system may supply power to wireless gateway 40 such that the user can energize electronic lock 44 from their wireless device. Any suitable device or method for providing external power to the appropriate portions of the present system may be utilized.

The present system runs software on hardware such as that described above, and defaults to a loop that monitors I/O and reports changes to a central server. The reporting is event driven, such that when a given event occurs the computer program interrupts its normal loop and executes a separate string of logic that handles the event. Once event-handling has been completed, the program returns to its default loop. All values and local events are stored locally in a computer-readable storage medium associated with the hardware of the system.

Computer program code for carrying out operations or aspects of the present system may be written in any suitable programming language, or using any combination of one or more programming languages. Object-oriented languages including, but not limited to, Java, JavaScript, C#, C++, Python, and Visual Basic, may be used may be utilized, as may conventional procedural programming languages like C, or other similar languages. Server-side scripting languages like PHP or server-side application frameworks like ASP.NET may also be utilized. Special-purpose programming languages like SQL, which is used to manage data in a relational database management system, may also be utilized. The foregoing programming languages are exemplary only, and are not intended to limit the present disclosure. The computer program code or instructions may be stored in a computer-readable medium that can direct a computer or other device produce an article of manufacture, such as instructions stored on a computer-readable medium, that implement the present system.

The present system preferably incorporates a number of security features that operate at varying levels within the present system. For example, encryption protocols are utilized to secure information transmitted among various components of the present system. Exemplary communications security protocols include Transport Layer Security (TLS) and Secure Shell (SSH). In addition, the present system may be configured to control access via port filtering, IP filtering, and any suitable method of network isolation. Mac address filtering may be used to exclude devices not authorized by the present system.

It is contemplated that the system of the present disclosure may be installed in any industrial process control enclosure, electrical enclosure, or field or remote enclosure that houses equipment to be monitored for power, theft, or open door. The present system may be utilized to monitor and control several processes, view information stored in the cloud, and to locally control the monitored processes. Some embodiments of the system include a cellular radio, wireless gateway (that, for example, may communicate with one or more cellular carriers), an open/closed indicator, an electronic lock, inputs and outputs as described above, and a computer system with a local database that can track and historicize events by user for audit purposes. It is preferred that process control data is maintained locally and uploaded into the cloud in a timely manner. Information from the system is sent to the cloud, where alarming, data retrieval, and reporting functions are accessible and customizable by a user of the system. The locking mechanism associated with the present system may preferably be locked and locked locally via wireless functionality using any portable wireless device (such as, for example, a phone or tablet), or can be unlocked remotely through the cloud hosted server for emergency unlocking situations. In such emergency situations it is preferred that unlocking be restricted to a user with high authorization levels. The present system may also be utilized as a multiple-state lock out/tag out system, allowing multiple digital locks to be established by multiple users, only to be unlocked when all users have removed their digital signature. The present system may also monitor power and processes to the enclosure where the present system is installed, and may generate an alert when power has been terminated. The power to generate the alert is preferably provided by a backup batter or power source that powers the system for a minimal run time following loss of primary power. Once power is restored, the present system may alert the user(s) that power has been restored, that the enclosure door is either open or closed and locked, or of any adverse scenario ascertainable by the system upon restoration of power. Process control data relating to the event, and continuing operation of the system, will once again be captured and uploaded to the cloud. As noted above, in situations wherein the present system has experienced continuous loss of primary and backup power, the system may preferably be energized externally by supplying power to, for example, the WiFi gateway. This allows the user to unlock the enclosure from a wireless device.

It should be noted that while certain logic flows of the present system, its interrupt handlers, and the like, are presented above, one of skill in the art may ascertain alternate logic flows, or modifications to the disclosure herein, upon reading the details of the present disclosure. Such alterations and modifications are considered to be within the spirit and scope of the present invention.

The invention claimed is:

1. A system for providing local and remote access to a simple on/off device, the system comprising:
   a hardware device comprising a microprocessor, an I/O interface, and WAN interface, where in the microprocessor is configured to coordinate the I/O interface, the WAN interface, and the LAN interface, and wherein the hardware device is configured to provide plug-and-play functionality with respect to a simple on/off device in electronic communication with said hardware device via said I/O interface, wherein the simple on/off comprises a bolt and a solenoid, and further wherein the hardware device is configured to read the status of the simple on/off device comprising a first state in which the simple on/off device is energized and a second state in which the simple on/off device is not energized;
   a cloud server in electronic communication with said hardware device via said LAN interface;
   a first client device in electronic communication with said cloud server and configured to access said hardware device there through, wherein the client device is configured to obtain the state of the simple on/off device from the cloud server and to change the state of the simple on/off device via the cloud server and said hardware device by allowing or disallowing the flow of current to the simple on/off device; and
   a second client device in electronic communication with said hardware device via said WAN interface;
   wherein the simple on/off device is not configured for remote access, wherein a user of said system can access, control, and/or monitor said simple on/off device via said hardware device using the first or the second client device access, and further wherein the user of said system can control said simple on/off device via said hardware device using the first or the second client device such that the user can alternate said simple on/off device between a first state in which the simple on/off device is receiving current and a second state in which the simple on/off device is not receiving current.

2. A system for monitoring and controlling an enclosure to which limited access is desired, the system comprising:
   a hardware device comprising an input/output interface, a networking interface, and a microprocessor configured to coordinate the input/output interface and the networking interface,
   a simple on/off electronic lock comprising a first state in which said simple on/off electronic lock is energized and a second state in which said simple on/off electronic lock is not energized, wherein the simple on/off electronic lock is in electronic communication with the input/output interface of the hardware device, wherein the simple on/off electronic lock comprises a bolt and a solenoid, and further wherein when the solenoid is energized, the bolt moves to an open position and when the solenoid is not energized, the bolt moves to a closed position;
   a cloud server in electronic communication with the networking interface of the hardware device; and
   a portable client device in electronic communication with the cloud server, wherein the simple on/off device is not configured for remote access, wherein the hardware device is configured to read the state of the simple on/off electronic lock and report that state to the cloud server, wherein the portable client device is configured to obtain the state of the simple on/off electronic lock from the cloud server, and further wherein the portable client device is configured to change the state of the simple on/off electronic lock via said cloud server and said hardware device.

3. The system according to claim 2, comprising a plurality of portable client devices, where said portable client device is one of said plurality of portable client devices, and further wherein said hardware device is configured to communicate via said networking interface with each of said plurality of portable client devices.

4. The system according to claim 3, wherein each of said plurality of portable client devices is configured to identify a user of said portable client device, and further wherein said hardware device uploads to the cloud server data relating to each user who has set the simple on/off electronic lock in a locked state via that user's portable client device.

5. The system according to claim 4, wherein said hardware device is configured to resist changing the state of said simple on/off electronic lock from a locked state to an unlocked state until every user recorded by the cloud server as setting the simple on/off electronic lock to the locked state subsequently sets the simple on/off electronic lock to the unlocked state.

\* \* \* \* \*